United States Patent
Lawrence

(10) Patent No.: US 6,615,207 B1
(45) Date of Patent: Sep. 2, 2003

(54) METHOD OF FORMULATING AND PRESENTING SEARCH QUERIES TO A TABULAR DATABASE THROUGH A USER-INTERACTIVE COMPUTER DISPLAY INTERFACE

(75) Inventor: John Andrew Lawrence, Fishers, IN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/210,201

(22) Filed: Dec. 10, 1998

(51) Int. Cl.[7] ..................... G06F 17/30; G06F 15/00; G06F 9/00
(52) U.S. Cl. ..................... 707/5; 707/3; 707/10; 707/100; 707/101; 707/104.1; 345/594; 345/744; 345/788
(58) Field of Search ................ 707/3, 4, 5, 6, 707/8, 10, 101, 102, 104, 104.1, 100, 1, 103 R; 345/594, 744, 754, 764, 788, 808, 803, 853, 967

(56) References Cited

U.S. PATENT DOCUMENTS

| | | | | |
|---|---|---|---|---|
| 4,829,427 A | * | 5/1989 | Green | 707/2 |
| 5,295,261 A | | 3/1994 | Simonetti | 395/600 |
| 5,546,529 A | | 8/1996 | Bowers et al. | 395/159 |
| 5,592,667 A | | 1/1997 | Bugajski | 395/613 |
| 5,632,007 A | * | 5/1997 | Freeman | 706/45 |
| 5,671,416 A | | 9/1997 | Elson | 395/702 |
| 5,694,591 A | * | 12/1997 | Du et al. | 395/602 |
| 5,710,916 A | | 1/1998 | Barbara et al. | 395/609 |
| 5,740,421 A | | 4/1998 | Palmon | 395/604 |
| 5,765,147 A | | 6/1998 | Mattos et al. | 707/4 |
| 5,778,354 A | | 7/1998 | Leslie et al. | 707/2 |

(List continued on next page.)

FOREIGN PATENT DOCUMENTS

| | | | | |
|---|---|---|---|---|
| EP | 0784275 A1 | * | 7/1997 | G06F/11/22 |
| WO | WO 91/09368 | * | 12/1990 | G06F/15/20 |
| WO | WO98/26360 | | 6/1998 | G06F/17/30 |

OTHER PUBLICATIONS

Housel, Barron C. and Shu, Nan C.; "A High–Level Data Manipulation Language for Hierarchical Data Structures", ACM; 1976; pp. 155–169.*
Dix, Alan; "Interactive querying locating and discovering information"; http://www.hiraeth.com/alan/papers/IQ98; 11th Sep. 1998; pp. 1–3. pp. 1–9 (attachment to pp. 1–3).*
"Tree Traversal Techniques to Implement Enhanced Searches in Tree View", vol. 38, No. 02, Feb. 1995.
"Multidimensional Index Structure with Multi–Level Entry and Skip–Level Search for Partially–Specified Queries", vol. 39, No. 11, Nov. 1996.

*Primary Examiner*—Vincent Millin
*Assistant Examiner*—Ella Colbert
(74) *Attorney, Agent, or Firm*—Jerry B. Kraft; Jeffrey S. Labaw

(57) ABSTRACT

In a computer controlled user-interactive display system interface through which the user may easily access stored search queries to database via a displayed search query tree, there is formulation and presentation of the tree of queries in a manner enabling user-interactive rearrangement of the tree. The displayed tree has a plurality of selectable nodes, each node representative of a stored search query, arranged in a hierarchical order indicative of the order of searching by said query. An interactive user input is enabled to rearrange said tree to a different hierarchical order, and the resulting rearranged tree with the different hierarchical order is displayed. In this manner, different users of said interface may access data from said database in an order relative to their respective needs. The invention may be most advantageously used with queries in structured query language and in relational databases.

12 Claims, 7 Drawing Sheets

U.S. PATENT DOCUMENTS

| | | | |
|---|---|---|---|
| 5,845,276 A | * 12/1998 | Emerson et al. | 707/2 |
| 5,848,404 A | * 12/1998 | Hafner et al. | 707/3 |
| 5,875,421 A | * 2/1999 | Takeuchi | 704/2 |
| 5,915,257 A | * 6/1999 | Gartung et al. | 715/503 |
| 5,974,407 A | * 10/1999 | Sacks | 707/1 |
| 6,058,391 A | * 5/2000 | Gardner | 705/26 |
| 6,067,552 A | * 5/2000 | Yu | 707/501 |
| 6,094,652 A | * 7/2000 | Faisal | 707/5 |
| 6,279,007 B1 | * 8/2001 | Uppala | 707/101 |

* cited by examiner

METHOD OF FORMULATING AND PRESENTING SEARCH QUERIES TO A TABULAR DATABASE THROUGH A USER-INTERACTIVE COMPUTER DISPLAY INTERFACE

CROSS-REFERENCE TO RELATED PATENT APPLICATION

"A USER-INTERACTIVE COMPUTER DISPLAY INTERFACE WITH A TREE HAVING A PLURALITY OF USER SELECTABLE NODES REPRESENTING A PLURALITY OF SEARCH QUERIES TO A TABULAR DATABASE", John Lawrence, now U.S. Pat. No. 6,356,286 filed on the same day and assigned to the same assignee as the present application.

TECHNICAL FIELD

The present invention relates to user-interactive computer supported display technology, and particularly to such user-interactive systems and methods which provide interactive users with user friendly interfaces for database management and access.

BACKGROUND OF THE INVENTION

The 1990's decade has been marked by a technological revolution driven by the convergence of the data processing industry with the consumer electronics industry. This advance has been even further accelerated by the extensive consumer and business involvement in the Internet over the past few years. As a result of these changes it seems as if virtually all aspects of human endeavor in the industrialized world requires human/computer interfaces. There is a need to make computer directed activities accessible to people who, up to a few years ago were computer illiterate or, at best, computer indifferent.

Thus, there is continuing demand for display interfaces to computers and networks which improve the ease of use for the interactive user to access functions and data from the computer. With desktop-like interfaces including windows and icons, as well as three-dimensional virtual reality simulating interfaces, the computer industry has been working hard to-fulfill such interface needs. However, in the area of database management, interfaces to the databases appear to be formidable obstacles to a great many users who would have considerable needs for data access. Of course, database access and management historically is one of the original primary computer functions, and, as such, it is full of language and functions developed and communicated between computer professionals. As a result, database management and access may be somewhat esoteric and foreboding to the new computer users in businesses and personal computer situations in which they most benefit from the development of and access to databases. Terms such as relational databases (RDBMS) structured query language (SQL) searches have put off such users. Less sophisticated users find it very difficult to frame SQL search queries out of the relatively complex language. As a result, except for some limited access to databases through spreadsheets, the bulk of new computer users have shown a reluctance to venture into database organization and database searching. Accordingly, the computer industries are trying to address the need to make interfaces for database organization less foreboding and more user friendly.

The copending patent application referenced above furnishes one solution to the above needs by providing a data processor controlled interactive display interface through which the user may easily access stored search queries to the database and then initiate selected searches executed by such queries. The interactive interface includes a displayed tree having at least one root node representative of a view into a table from said database and a plurality of subnodes under said root node, each subnode representative of a stored search query for said table view.

SUMMARY OF THE INVENTION

The present invention provides for the formulation and presentation of a displayed tree of queries of the copending application in a manner enabling user-interactive rearrangement of the tree. The invention involves initially interactively arranging a displayed tree having a plurality of selectable nodes, each node representative of a stored search query, arranged in a hierarchical order indicative of the order of searching by said query. An interactive user input is enabled to rearrange said tree to a different hierarchical order, and the resulting rearranged tree with the different hierarchical order is displayed. In this manner, different users of said interface may access data from said database in an order relative to their respective needs. As with the above-mentioned copending application, it may be most advantageously used with queries in SQL and in relational databases. In such databases that are organized in columns, the order of searching would be the order in which said columns are accessed during the search.

DETAILED DESCRIPTION OF THE PREFERRED EMBODIMENT

Figure 1:
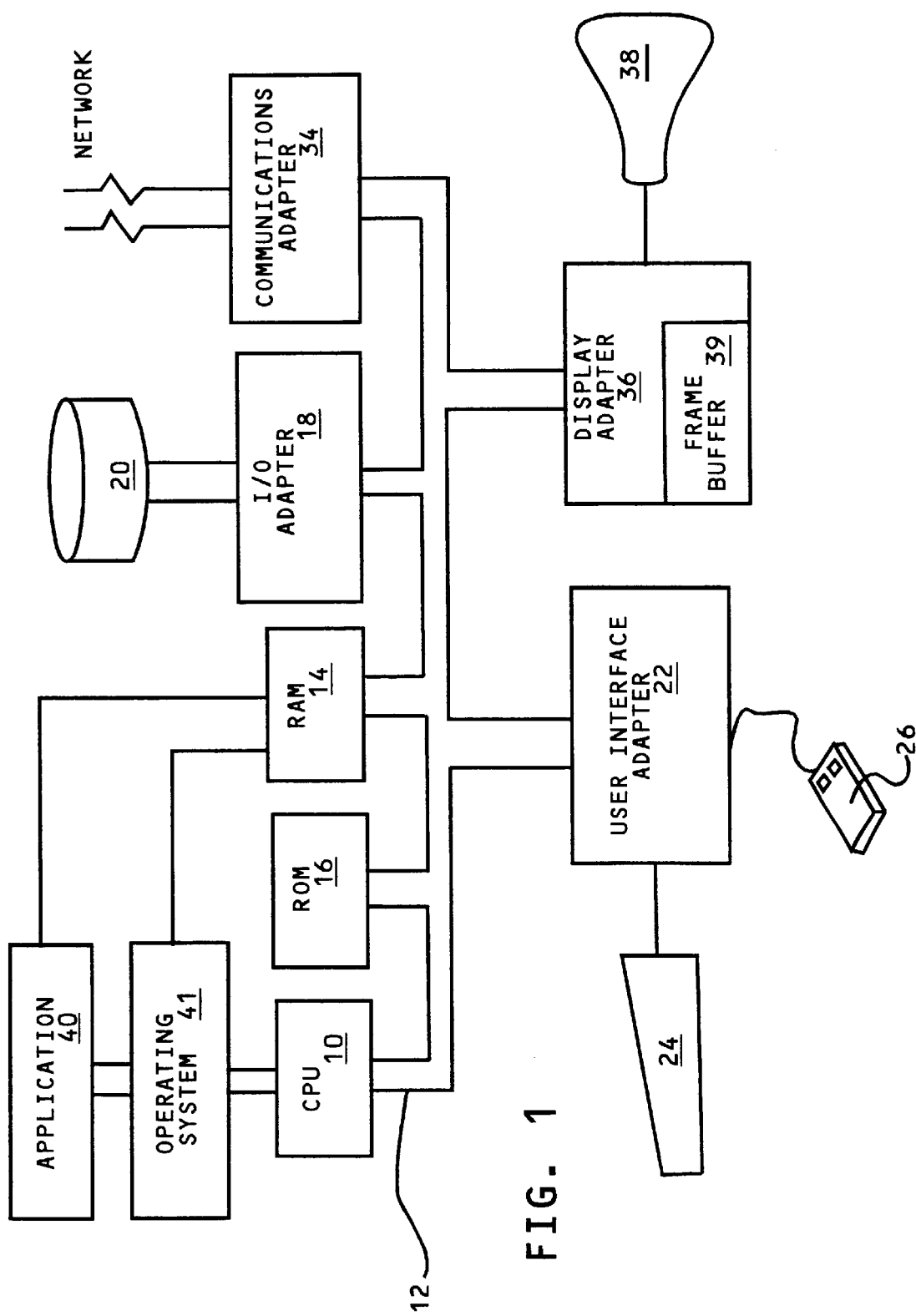
FIG. 1 is a block diagram of a generalized data processing system including a central processing unit in which the database search system of the present invention may be implemented.

Referring to FIG. 1, a typical data processing system is shown which may function as a basic computer controlled system used in implementing the present invention of rearranging, editing or modifying display interface trees of selectable search queries. A central processing unit (CPU) 10, such as one of the PC microprocessors or workstations, e.g. RISC System/6000™ (RISC System/6000 is a trademark of International Business Machines Corporation) series available from International Business Machines Corporation (IBM), is provided and interconnected to various other components by system bus 12. An operating system 41 runs on CPU 10, provides control and is used to coordinate the function of the various components of FIG. 1. Operating system 41 may be one of the commercially available operating systems such as AIX 6000™ or OS/2™ ("AIX 6000" and "OS/2" are trademarks of International Business Machines Corporation) available from IBM; Microsoft's Windows NT™ or Windows 95™, as well as UNIX and AIX operating systems. Application programs 40 controlled by the system are moved into and out of the main memory random access memory (RAM) 14 and consequently into and out of secondary storage, disk drive 20 as needed. The database search tree modification or editing system of this invention, which will subsequently be described in greater detail is implemented as an application program 40. A read only memory (ROM) 16 is connected to CPU 10 via bus 12 and includes the basic input/output system (BIOS) that controls the basic computer functions. RAM 14, I/O adapter 18 and communications adapter 34 are also interconnected to system bus 12. I/O adapter 18 may be a small computer system interface (SCSI) adapter that communicates with the disk storage device 20. Communications adapter 34 interconnects bus 12 with an outside network enabling the data processing system to communicate with other such systems over a local area network (LAN) or wide area network (WAN) such as the Internet. It should be noted the database search query tree modification system of the present invention may be used with respect to databases which are accessed over a network. I/O devices are also connected to system bus 12 via user interface adapter 22 and display adapter 36. Keyboard 24 and mouse 26 are all interconnected to bus 12 through user interface adapter 22. It is through such input devices that the user may interactively modify and rearrange the database search query trees according to the present invention in the manner to be subsequently described. Display adapter 36 includes a frame buffer 39, which is a storage device that holds a representation of each pixel on the display screen 38. Images may be stored in frame buffer 39 for display on monitor 38 through various components such as a digital to analog converter (not shown) and the like. By using the aforementioned I/O devices, a user is capable of inputting information to the system through the keyboard 24 or mouse 26 and receiving output information from the system via display 38 for purposes of search query tree editing.

There will now be described a simple illustration of the present invention with respect to the display screens of FIGS. 2 through 4. When the screen images are described, it will be understood that these may be rendered by storing image and text creation programs, such as those in any conventional window operating system in the RAM 14 of the system of FIG. 1. The operating system is diagrammatically shown in FIG. 1 as operating system 41. An embodiment of the present invention will be described commencing with the display screen shown in FIG. 2. This initial display screen is presented to the viewer on display monitor 38 of FIG. 1. In accordance with conventional techniques, the user may control the screen interactively through a conventional I/O device such as mouse 26 of FIG. 1, which operates through user interface 22 to call upon programs in RAM 14 cooperating with the operating system 41 to create the images in frame buffer 39 of display adapter 36 to control the display on monitor 38.

Figure 2:
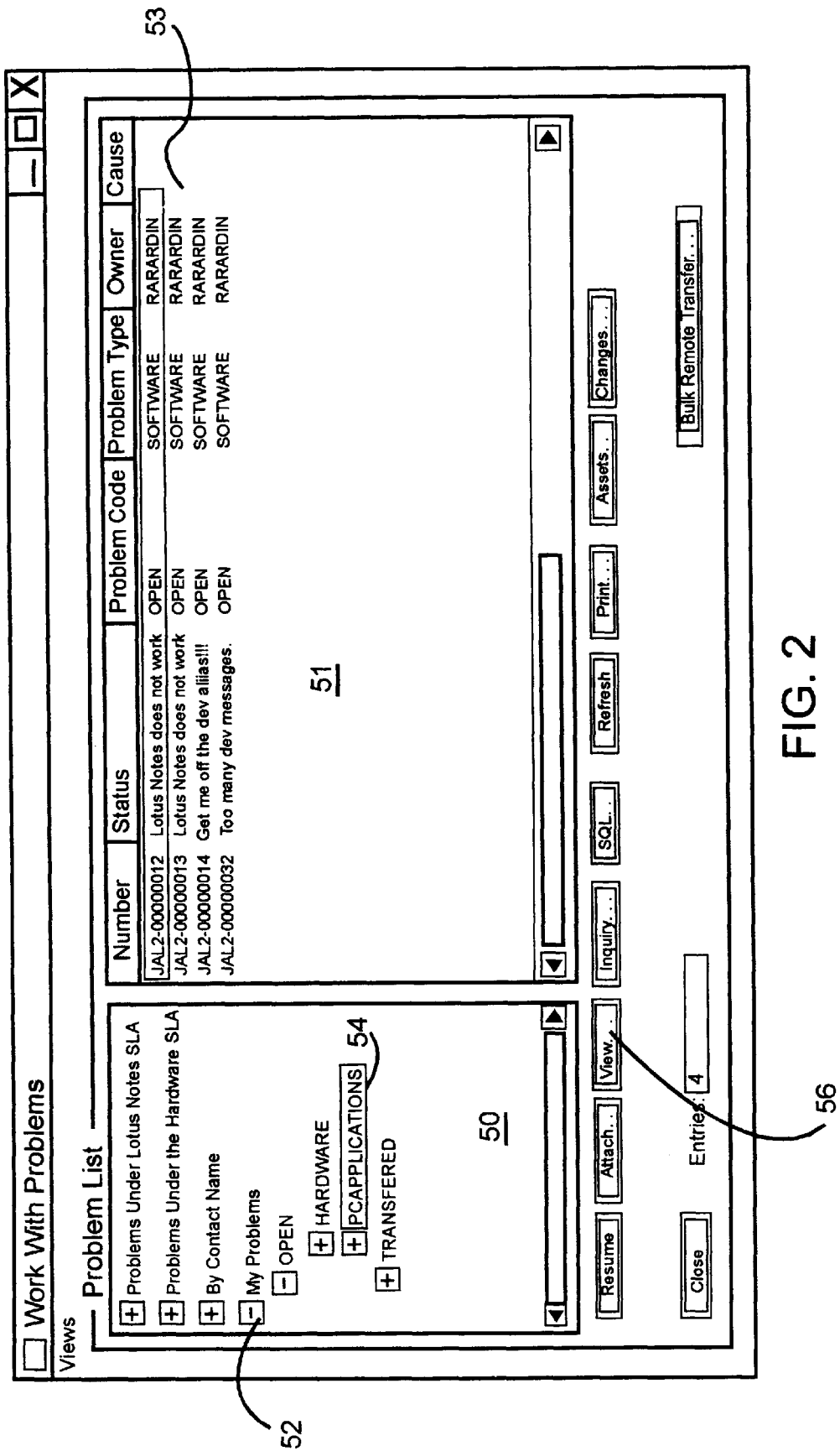
FIG. 2 is a diagrammatic view of a display screen on which a tree representative of a portion of a database is shown along side one aspect of a table view resulting from the execution of a subnode represented search query.

The display interface screen of FIG. 2 shows the interactive interface used in the above-mentioned copending patent application and is used to provide the user with a vehicle for searching a relational database covering the problems of a given computer system. Thus, the screen is entitled "Work with Problems". The interface is organized to permit the user to select an already stored SQL query and to have the search executed. A hierarchical tree having, at a high level, a set of root nodes such as node 52, "My Problems", each represent a table view in the relational database is presented in a first region 50 of the screen. Each of the root nodes may have a hierarchy of levels of subnodes such as subnode 54, "PC APPLICATIONS", each of which represent a stored search query into the table view of the root node. The tree of root nodes and their respective subnodes is of course configured for the particular database and desired view tables. The tree of search queries shown in FIG. 2 is used in the search process described in my copending concurrently filed copending patent application cross-referenced above.

In the illustration of FIG. 2, the user is working with a particular tree 52 of search queries in accordance with the copending application. With respect to FIGS. 3 and 4, we will describe how a tree of search queries may be modified or rearranged in accordance with the present invention. Let us assume that the user wishes to rearrange or modify his tree of search queries. Then by some suitable interactive selection means, he goes into the edit or change mode. This could be as simple as picking one of the menu bar buttons such as view button 56 in FIG. 2. Then, through a conventional drop down menu available in a windows operating system, the user could select edit and get the dialog screen panel of FIG. 3 which has the tree or appropriate portion of a tree 63 to be edited shown on one part of the screen and a scrollable list of database columns 60 on the other part of the screen. In the arrangement shown, the tree 63 may be edited by pointing to a subnode and removing the column providing the subnode, e.g. "MODULE" 65 by picking "Remove" button 62 or adding a column to provide the subnode by scrolling to the column in list 60 through scroll bar 66, and then picking the "Add" button 61. In the example shown, "MODULE" 65 has just been added as a subnode by scrolling to "MODULE" column 64 which is shown highlighted in list 60, followed by the add button 61. It should be understood that at each subnode such as subnode 65, the terms of the search query represented at that subnode will be determined by the sequence of subnodes preceding or above that subnode in the hierarchy of tree 63. For example, since the sequence of "PROBLEM CODE-SYSTEM-COMPONENT-ITEM" precedes "MODULE", search query represented by subnode 65 would have a corresponding sequence of database columns.

Figure 3:
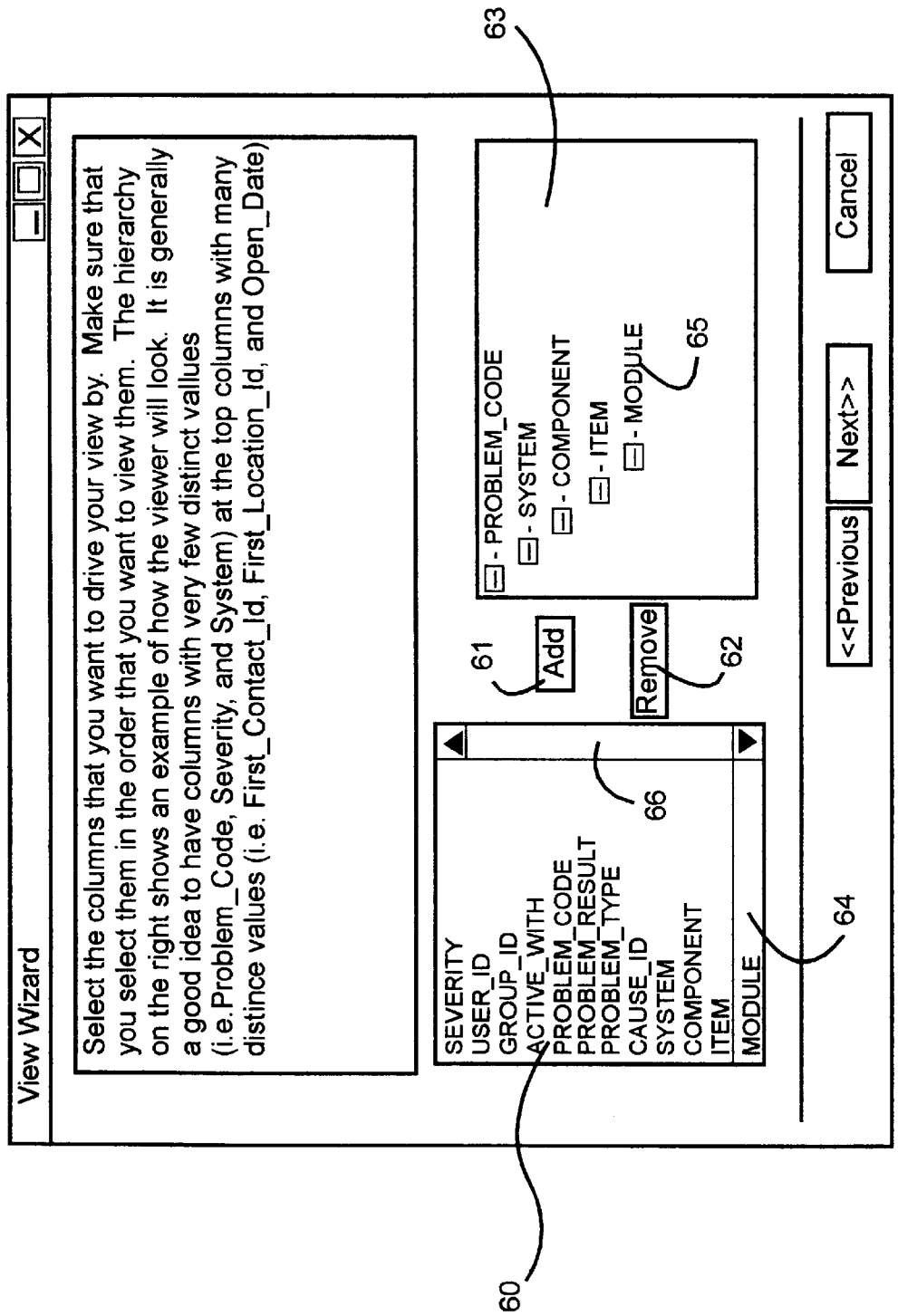
FIG. 3 is a diagrammatic view of a display screen dialog panel which may be used to interactively rearrange a query tree in accordance with the present invention.
Figure 4:
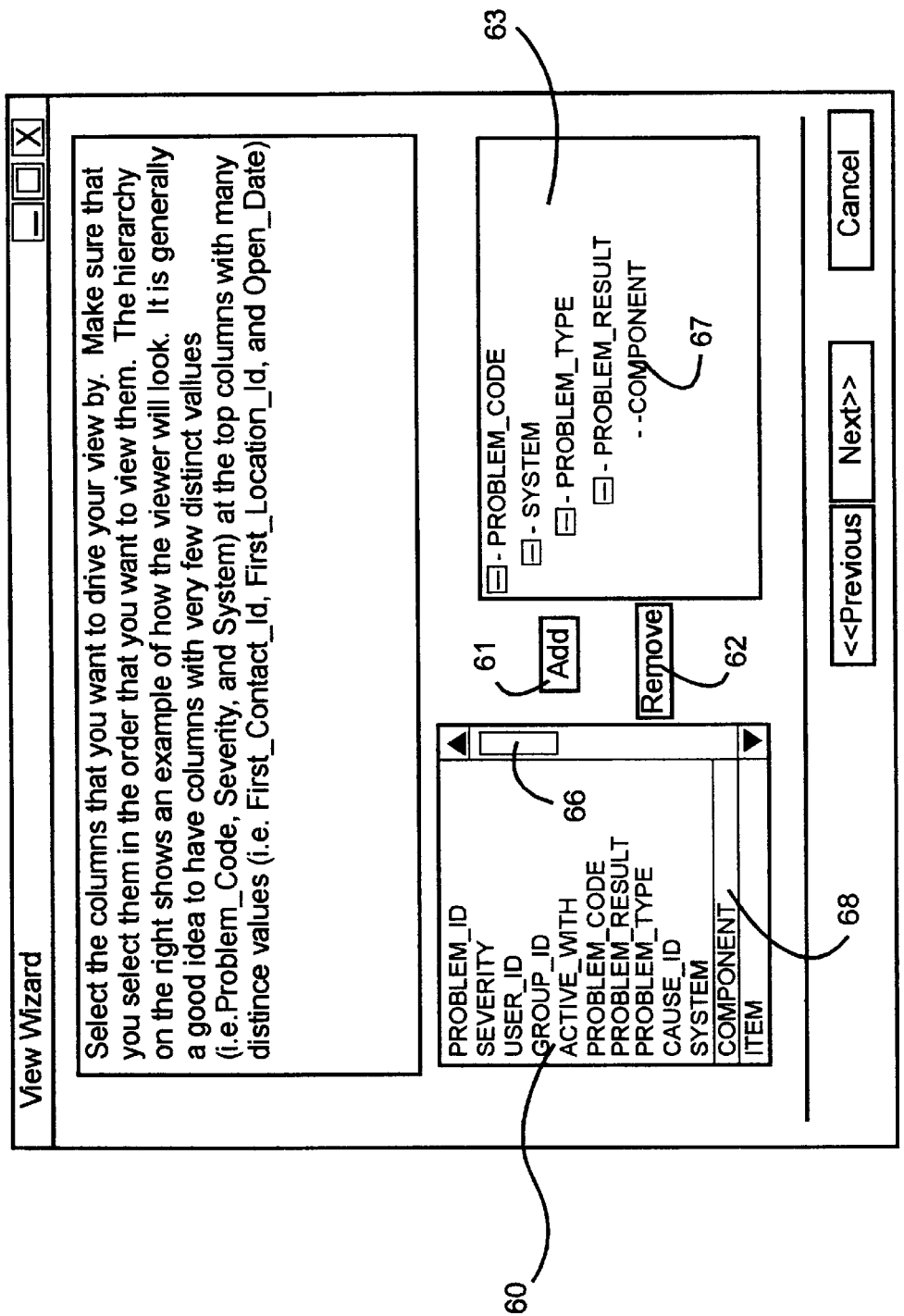
FIG. 4 is the display screen dialog panel of FIG. 3 after the panel has been used to interactively rearrange a portion of a query tree.

FIG. 4 shows the dialog panel of FIG. 3, after the tree 63 has been modified using the procedures described above. The "ITEM" and "MODULE" subnodes have been removed, and the "PROBLEM_RESULT" and "PROBLEM_RESULT" subnodes added where indicated. The "COMPONENT" subnode may have been removed during some previous modification but has just been added by scrolling via scroll bar 66 to "COMPONENT" column 68 shown highlighted, picking the Add button 61 to put it at subnode 67 in modified or rearranged tree 63. The display may now be returned to a search operational screen like that of FIG. 2 by any convenient means such as picking previous screen 69. The search operational screen will include the modification and rearrangements made as described with respect to FIGS. 3 and 4.

While the previous description covered how a tree of search queries could be rearranged or modified, it should be understood that the process could also be used to construct such an initial tree. In such an original tree construction, the dialog screen of FIG. 3 could be used but there would be no tree in the tree window 63. The user could then scroll through the list of database columns and select and add the columns in his desired order. As set forth above, the order of the columns and, thus, the subnodes in the tree would determine the terms and structure of the search query represented by any particular subnode. The actual search queries provided by the system are formed through a stored query template structure providing the framework which is completed by the stored sequence of the selected order of columns (subnode hierarchy).

Figure 5:
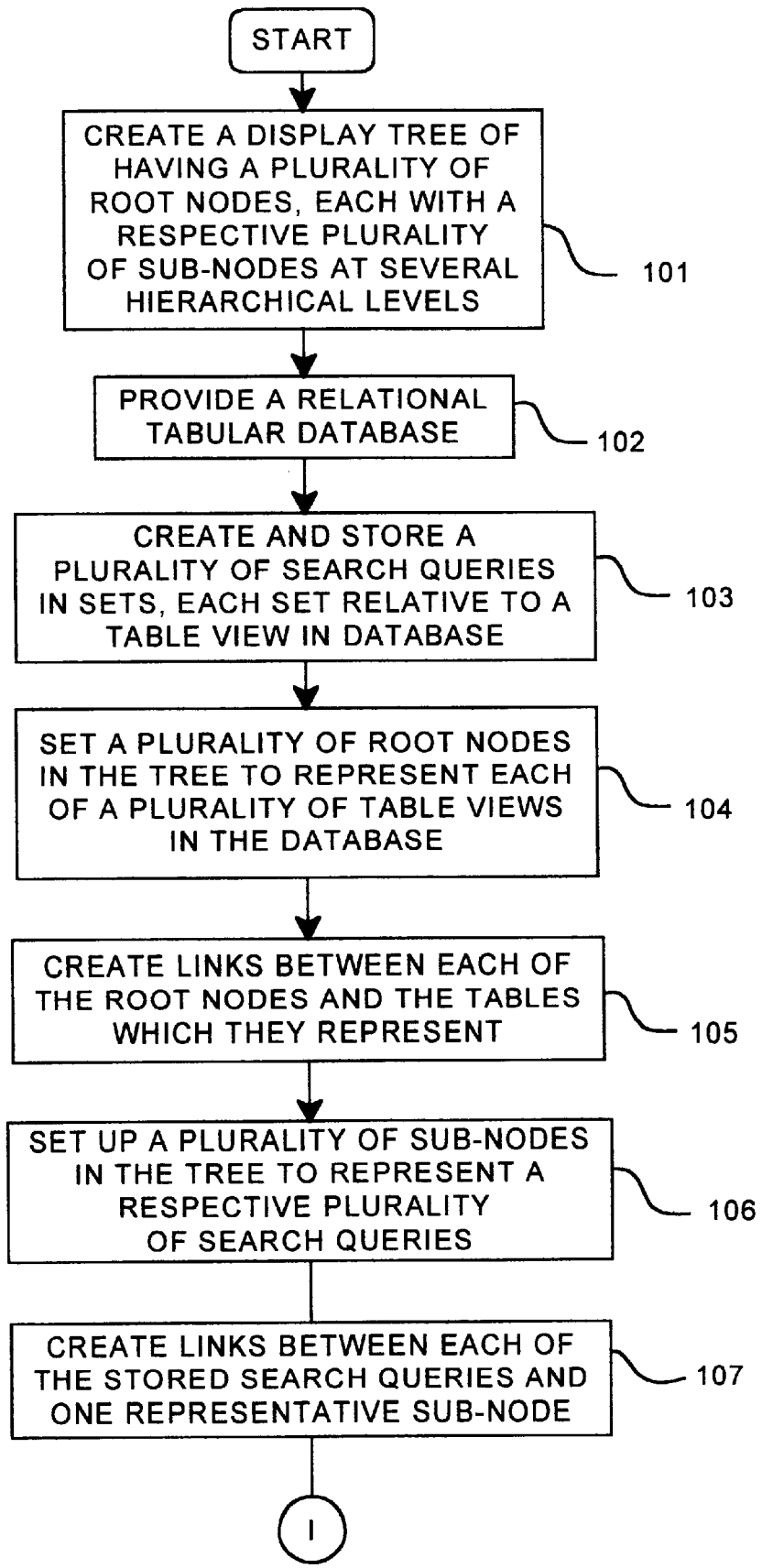
FIGS. 5 and 6 combine into a flowchart of the basic elements which are set up in the system and program in a computer controlled display system for modifying and rearranging the tree of search queries system according to the present invention.
Figure 6:
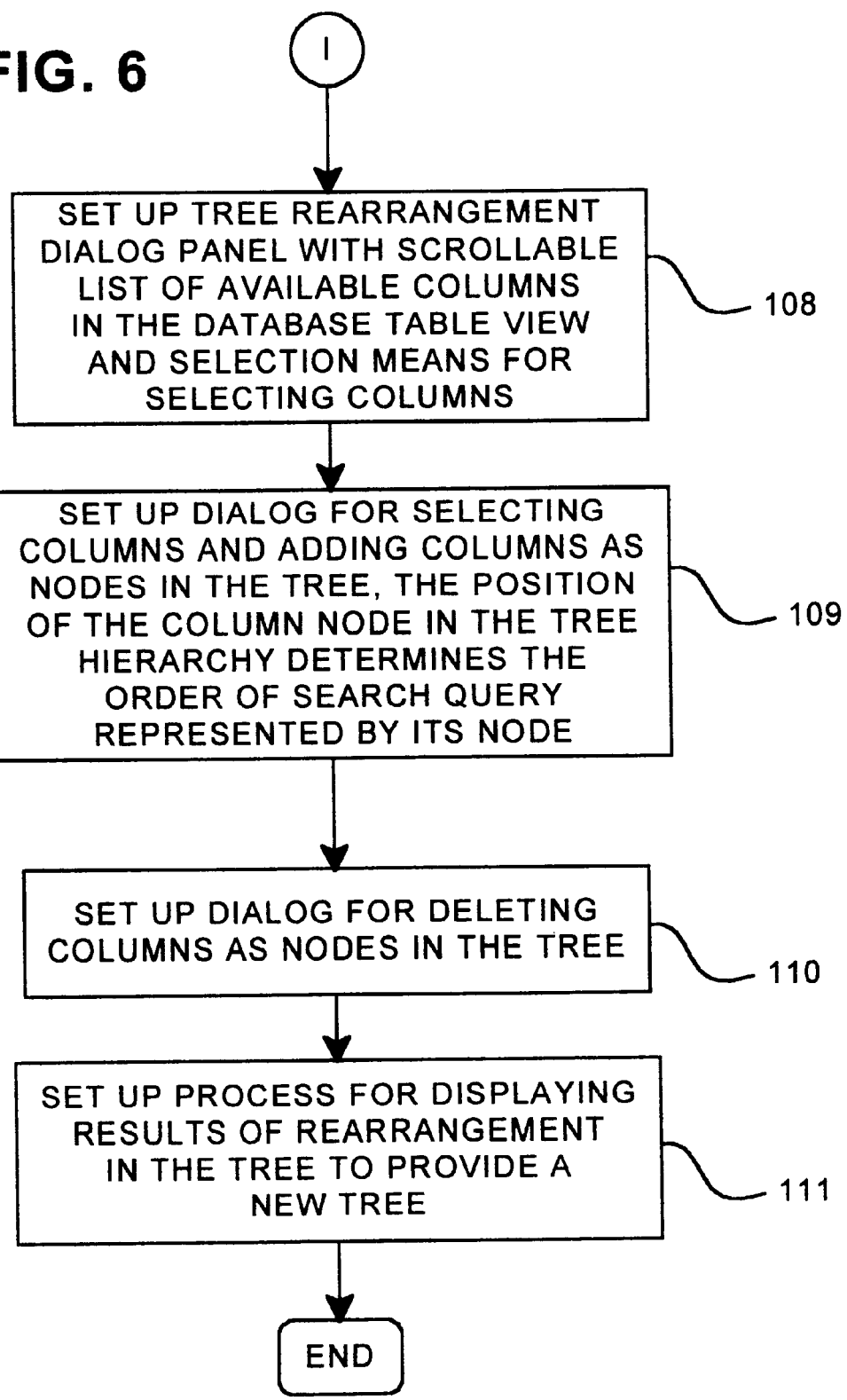
Figure 7:
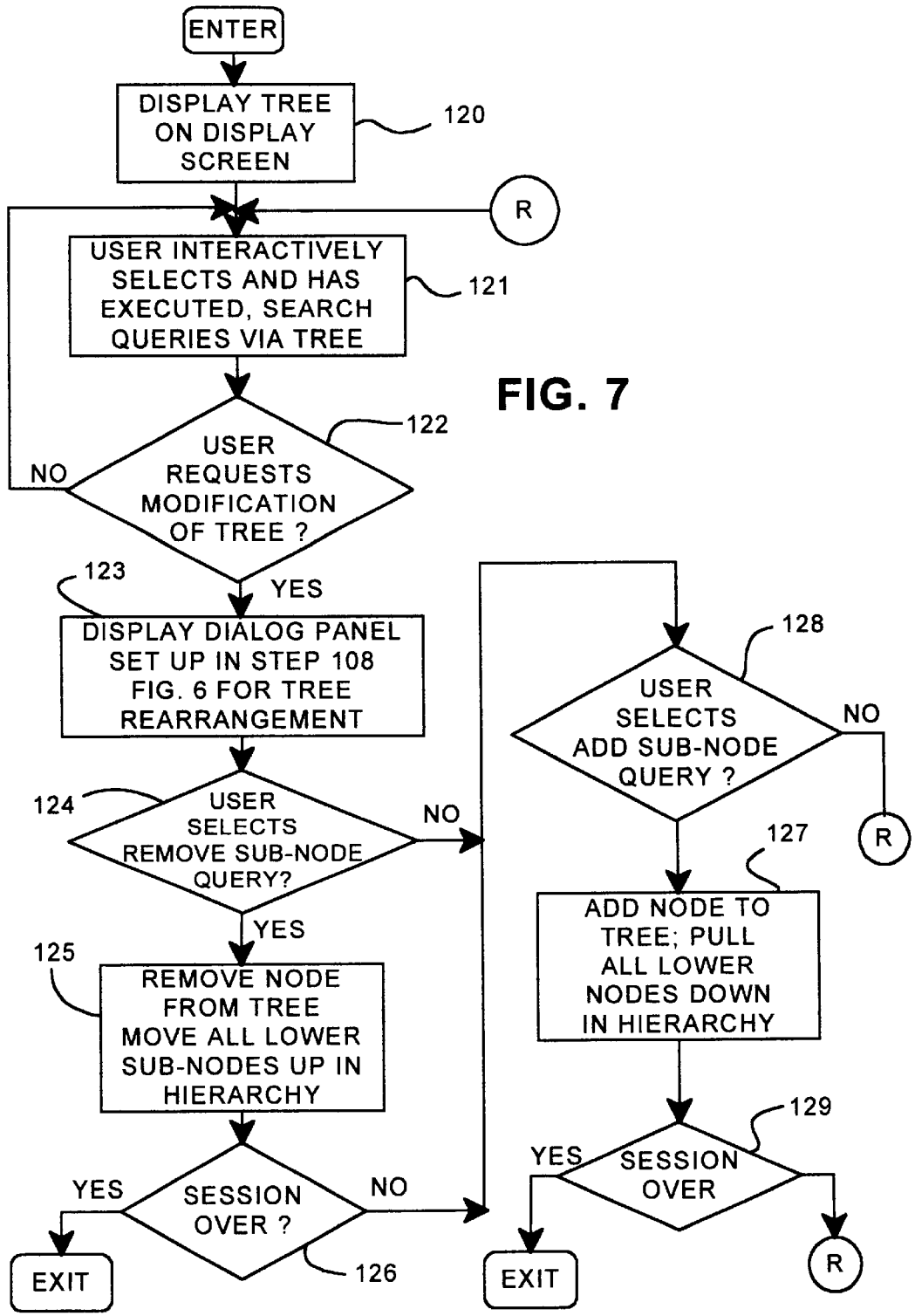
FIG. 7 is a flowchart of the steps involved in rearranging a tree of database search queries according to the set up of FIGS. 5 and 6.

Now with reference to FIGS. 5 through 7, we will describe a process implemented by the present invention in conjunction with the flowcharts of these figures. The steps in FIGS. 5 and 6 relate to the setting up of the tree structure in the process of this invention for modifying and rearranging that structure to thereby modify and rearrange the search queries. First, step 101, a display tree is created with a plurality of root nodes, each of which have a respective plurality of subnodes at several hierarchical levels. The relational database which is to be searched is provided, step 102. A plurality of search queries are created in sets, each relative to a table view of the database, step 103. A plurality of root nodes in the tree are set to respectfully represent each of a plurality of table views in the database, step 104. Links are created between each of the root nodes and the particular tables they respectively represent, step 105. Set up a plurality of subnodes in the tree to respectively represent a plurality of search queries, step 106. Step 107, links are created between each of the subnodes and the stored query represented by the-subnode. The process then branches via exit/entry point "I" to step 108 in FIG. 6 whereat there is set up a dialog screen panel like that of FIG. 3 with a scrollable list of columns available for search in the database table view and suitable column selection means. Next, step 109, there is set up an interactive dialog for adding columns as nodes in the tree with the position of the column subnode in the tree hierarchy determining the order of the search query represented by the subnode. This has been previously described with respect to FIGS. 3 and 4. A dialog is also set up, step 110, for deleting columns as subnodes, e.g. "Remove" button, FIG. 3. Lastly, a routine is set up for displaying the rearrangement in the form of a new search query tree, step 111.

Now, with reference to FIG. 7, we will describe an illustrative run of a search involving queries set up according to the process described in FIGS. 5 and 6. The search query tree rearrangement program is run as an application program, either alone or incorporated into a database management system such as Access™, dBase IV or dBase 5. First, step 120, the tree is displayed and used by the user wherein the user selects and has executed search queries via the display tree, step 121. The process is continuously monitored as to whether the user has requested a modification of the tree via decision step 122. If No, then the flow is returned to step 121 wherein the user continues accessing the database, and monitoring continues via decision step 122. If the decision is Yes, a modification is requested, then, the dialog panel is set up, step 123, according to the process of FIG. 6, step 108, for tree rearrangement. This is the dialog panel shown in FIGS. 3 and 4. First, a determination is made as to whether the user has requested the removal of a subnode search query from the tree, step 124. If Yes, step 125, the selected node is removed from the tree, and all of the lower nodes in the tree are moved up in the hierarchy. At this point, a decision may be made as to whether the user wishes to end the session, step 126. If Yes, the session is exited. If No, then the process goes to decision step 128 where a determination is made as to whether the user has selected to add any column as a subnode. If No, then the process returns to step 121 via branch "R", and the session continues as previously described. If Yes, then, step 127, the column is added to the tree as a subnode, and all lower subnodes are moved down in the search query tree hierarchy. At this point, a determination is made as to whether the session is over, step 129. If Yes, the session is ended and exited. If No, then the process returns to step 121 via branch "R", and the session continues as previously described.

One of the preferred implementations of the present invention is as an application program made up of programming steps or instructions resident in RAM 14, FIG. 1, during computer operations. Until required by the computer system, the program instructions may be stored in another readable medium, e.g., in disk drive 20, or in a removable memory such as an optical disk for use in a CD-ROM computer input or in a floppy disk for use in a floppy disk drive computer input. Further, the program instructions may be stored in the memory of another computer prior to use in the system of the present invention and transmitted over a LAN or a WAN, such as the Internet, when required by the user of the present invention. One skilled in the art should appreciate that the processes controlling the present invention are capable of being distributed in the form of computer readable media of a variety of forms.

Although certain preferred embodiments have been shown and described, it will be understood that many changes and modifications may be made therein without departing from the scope and intent of the appended claims.

What is claimed is:

1. A method of formulating and presenting search queries to a database through a data processor controlled user-interactive display interface comprising:

interactively arranging a displayed tree having a plurality of selectable nodes, each node representative of a stored search query, arranged in a hierarchical order indicative of the order of searching by said query, enabling an interactive user input to rearrange said tree to a different hierarchical order, and displaying said tree with said different hierarchical order whereby different users of said interface may access data from said database in an order relative to their respective needs.

2. The method of claim 1, wherein said database is a relational database.

3. The method of claim 2 wherein said search queries are generated in Structured Query Language.

4. The method of claim 3 wherein the database is organized in columns, and said order of searching is the order in which said columns are accessed during the search.

5. A data processor controlled user-interactive display system for formulating and presenting search queries to a database comprising:

interactive means for arranging a displayed tree having a plurality of selectable nodes, each node representative of a stored search query, arranged in a hierarchical order indicative of the order of searching by said query, means for enabling an interactive user input to rearrange said tree to a different hierarchical order, and displaying said tree with said different hierarchical order whereby different users of said interface may access data from said database in an order relative to their respective needs.

6. The display system of claim 5, wherein said database is a relational database.

7. The display system of claim 6 wherein said search queries are generated in Structured Query Language.

8. The display system of claim 7 wherein the database is organized in columns, and said order of searching is the order in which said columns are accessed during the search.

9. A computer program having program code included on a computer readable medium for providing a data processor controlled user-interactive display system for formulating and presenting search queries to a database comprising:

interactive means for arranging a displayed tree having a plurality of selectable nodes, each node representative of a stored search query, arranged in a hierarchical order indicative of the order of searching by said query, means for enabling an interactive user input to rearrange said tree to a different hierarchical order, and displaying said tree with said different hierarchical order whereby different users of said interface may access data from said database in an order relative to their respective needs.

10. The computer program of claim 9, wherein said database is a relational database.

11. The computer program of claim 10 wherein said search queries are generated in Structured Query Language.

12. The computer program of claim 11 wherein the database is organized in columns, and said order of searching is the order in which said columns are accessed during the search.

\* \* \* \* \*